United States Patent [19]

Goloff et al.

[11] 4,041,803
[45] Aug. 16, 1977

[54] RUBBER TORSIONAL VIBRATION DAMPER WITH COOLING MEANS

[75] Inventors: Alexander Goloff, East Peoria; Mark Frederick Sommars, Peoria, both of Ill.

[73] Assignee: Caterpillar Tractor Co., Peoria, Ill.

[21] Appl. No.: 636,509

[22] Filed: Dec. 1, 1975

[51] Int. Cl.² ............................................. F16D 15/12
[52] U.S. Cl. ....................................................... 74/574
[58] Field of Search ........................... 74/574; 188/1 B

[56] References Cited

U.S. PATENT DOCUMENTS

| | | | |
|---|---|---|---|
| 2,594,555 | 4/1952 | Hardy | 74/574 |
| 2,882,747 | 4/1959 | Haushalter | 74/574 |
| 2,898,777 | 8/1959 | Boehm | 74/574 |
| 2,992,569 | 7/1961 | Katzenberger | 74/574 |
| 3,479,907 | 11/1969 | Hall | 74/574 |
| 3,945,269 | 3/1976 | Bremer, Jr. | 74/574 |

*Primary Examiner*—Samuel Scott
*Assistant Examiner*—Randall Heald
*Attorney, Agent, or Firm*—Phillips, Moore, Weissenberger, Lempio & Majestic

[57] ABSTRACT

A vibration damper for rotating members consists of a hub member joined to an inertia member by a plurality of elastic elements. Cooling fins on the inertia member and between the elastic element provide for dissipation of heat from the inertia member and the elastic elements. The cooling fins are parallel to the side surfaces of the insertia member. In an alternate embodiment, the cooling fins are angled to the side surfaces of the inertia member to augment the cooling effect of integral fins therein. In further alternate embodiments the hub member is bifurcated and the cooling fins and elastic member are oriented at angles to the axis of rotation of the hub.

10 Claims, 8 Drawing Figures

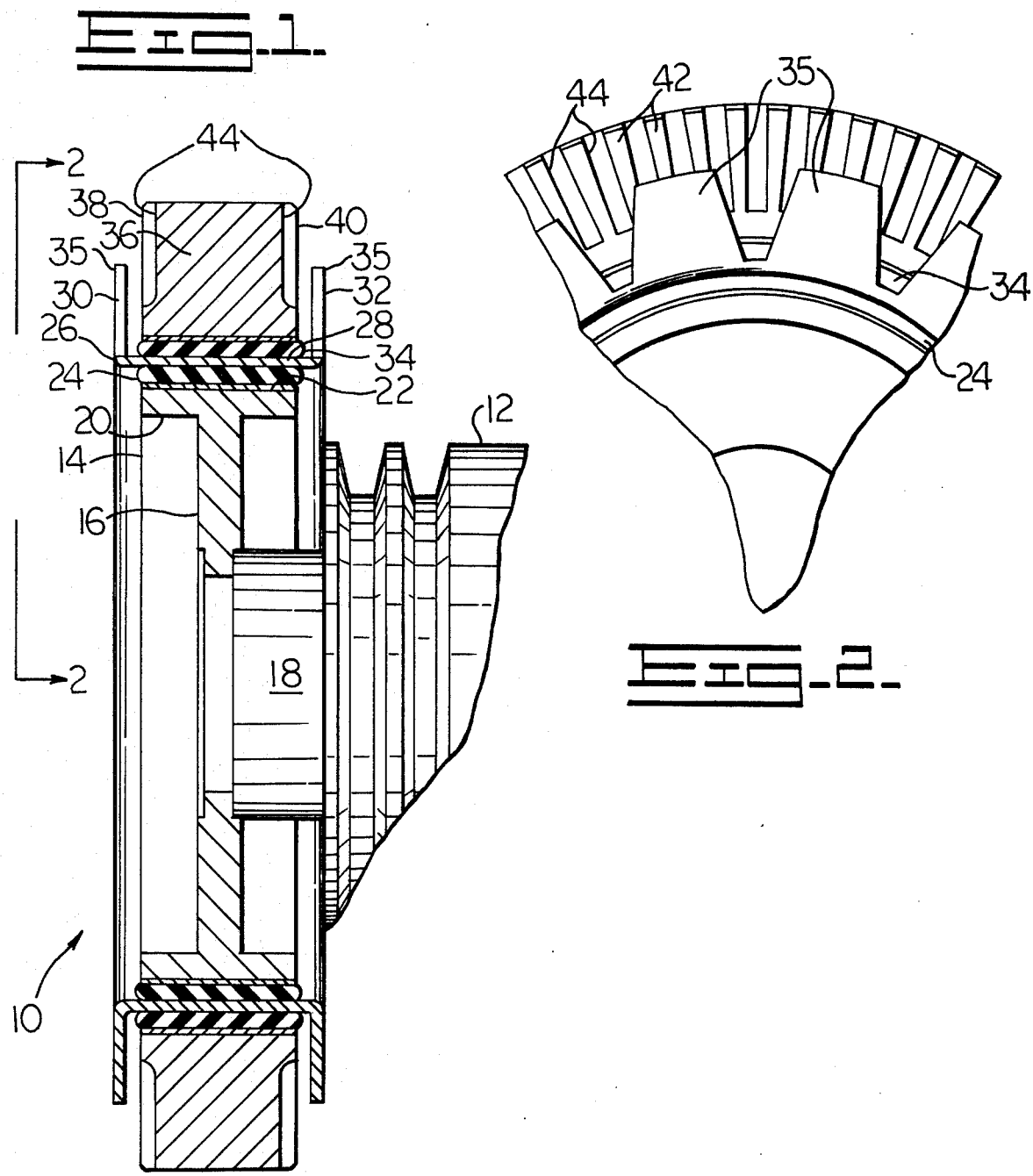

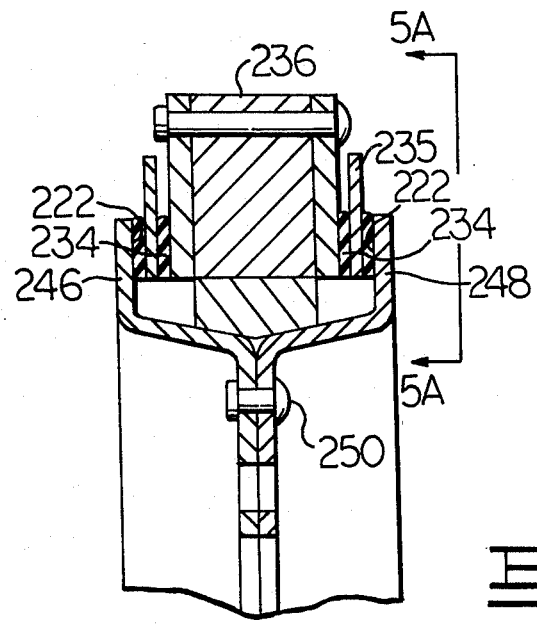
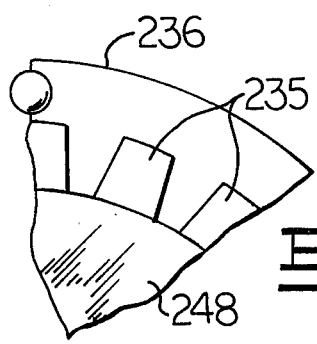
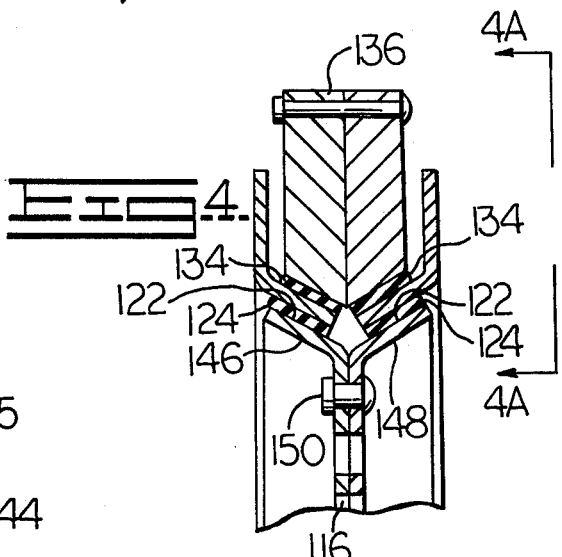
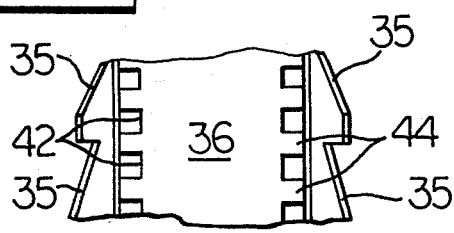
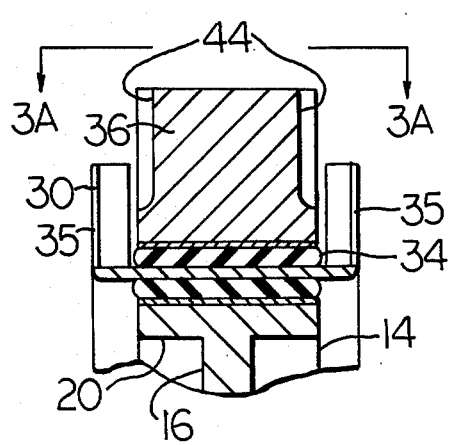
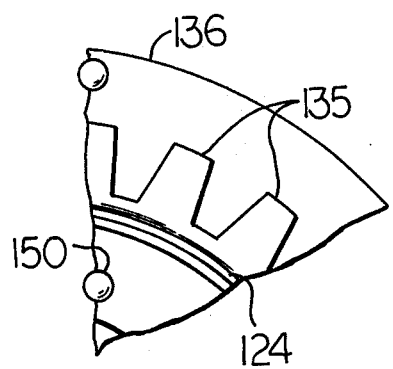

RUBBER TORSIONAL VIBRATION DAMPER WITH COOLING MEANS

BACKGROUND OF THE INVENTION

This invention relates to vibration dampers which are capable of absorbing and dissipating vibration energy in rotating members such as crankshafts, etc. In particular, this invention is directed to cooling fins for dissipating heat generated in vibration dampers of the type having an inertia member mounted on a hub by an intermediate elastic member.

Crankshafts of internal combustion engines occasionally vibrate at certain engine speeds due to the forces generated in engine operation. This engine vibration, unless damped, can cause breakage of the crankshaft. In order to avoid such vibration, it is frequently the practice to add a torsional vibration damper to the end of the crankshaft.

In modern practice, such dampers take the form of a hub member mounted on the crankshaft and an inertia member mounted on the hub member by means of an intermediate elastic vibratory movement energy-absorbing and dissipating element. Examples of this type of damper may be found in U.S. Pat. No. 2,477,081 to Peirce and U.S. Pat. No. 3,670,593 to Troyer. The mass of the inertia member is so selected in conjunction with the resiliency of the elastic element that it is put in vibration in opposition to the vibration of the crankshaft whenever the crankshaft vibrates in tune. In this manner, it acts to dampen out the torsional vibrations in the crankshaft through a hysteresis effect in the elastic element. Typically, the elastic element is made of rubber material. Unfortunately, a great amount of heat is generated within the rubber or elastic element during operation. This heat can cause degradation and failure of the elastic element, requiring frequent replacement thereof.

In order to avoid this, torsional vibration dampers have been constructed with integral fins on the inertia member. An example of this type of construction is found in U.S. Pat. No. 3,314,304 to Katzenberger et al. However, the great amount of heat generated within the elastic element is not sufficiently dissipated by these integral fins.

SUMMARY AND OBJECTS OF THE INVENTION

This invention comprises a torsional vibration damper for a rotary member such as a crankshaft. The damper includes a generally cylindrical hub member which is adapted to be mounted on a rotary member such as a crankshaft which defines an axis of rotation. A plurality of vibratory movement energy absorbing and dissipating elements are mounted on the periphery of the hub and an inertia member, in turn, is mounted thereon. Cooling fins project between the vibratory movement energy absorbing and dissipating element to conduct heat away from such elements. In the first embodiment, the fins are generally parallel to the side surfaces of the inertia member and augment integral fins therein. In the second embodiment, the fins are angled to the side surfaces for an enhanced cooling effect. In additional embodiments, the hub is bifurcated and is at a peripheral surface angled to the axis direction.

It is therefore the primary object of this invention to provide an improved cooling fin means for a torsional vibration damper.

It is a further object of this invention to provide such cooling fin means which conduct heat from elastic vibratory movement energy absorbing and dissipating elements intermediate a hub and an inertia member.

Other objects and advantages of this invention will become more readily apparent by having reference to the following description which makes reference to the attached drawings.

BRIEF DESCRIPTION OF THE DRAWINGS

FIG. 1 is an elevational sectional view of the torsional vibration damper of the instant invention mounted on a crankshaft and showing details thereof;

FIG. 2 is a partial side elevational view of the same taken along lines 2—2 in FIG. 1;

FIG. 3 is a partial sectional elevational view of an alternate embodiment wherein the cooling fins are angled;

FIG. 3A is a view of the same taken along the lines 3A—3A in FIG. 3;

FIG. 4 is a partial elevational sectional view of yet another alternate embodiment wherein the hub is bifurcated;

FIG. 4A is a view of the same taken along the lines 4A—4A in FIG. 4;

FIG. 5 is a sectional elevational view of still another embodiment similar to FIG. 4; and FIG. 5A is a view taken along the lines 5A—5A in FIG. 5.

DETAILED DESCRIPTION

Turning to FIG. 1, there is shown generally at 10 a torsional vibration damper mounted on one end of a crankshaft 12 which defines an axis of rotation. The torsional vibration damper includes a generally cylindrical hub member 14 having a radially inwardly extending portion 16 mounted on a crankshaft end 18. The hub further includes a generally axially extending portion 20 having a peripheral axially extending cylindrical surface 22. Mounted upon the axially extending cylindrical surface of the hub 14 by means such as bonding is a vibratory movement energy absorbing and dissipating element 24. Similarly mounted upon the thus described element is a cooling fin means 26. The cooling fin means is generally pulley shaped, having a central, generally axially directed portion 28 and a pair of opposite, radially directed portions 30, 32. The radially directed portions 30, 32 form a plurality of fins 35, as best seen in FIG. 2. These fins serve to dissipate heat from the first elastic element 24 as well as a second elastic element 34, which is mounted on the horizontally directed portion 28.

Mounted on the second vibratory movement energy absorbing and dissipating element is a generally ring shaped inertia member 36. Ring shaped inertia member 36 defines a pair of generally radially directed side surfaces 38, 40, within which are located a plurality of integral grooves 42 which define integral cooling fins 44. These grooves and fins are peripherally arranged around the inertia member as best seen in FIG. 2.

In operation, rotation of the torsional vibration damper causes movement of the fins 35 through the surrounding air medium so as to dissipate heat conducted thereto from the elastic elements 24, 34, by means of portion 28. The elastic elements may conveniently be of rubber material and the cooling fins 35 of metal, such as aluminum.

Turning to FIG. 3, there is shown a second embodiment which is alike the embodiment shown in FIGS. 1 and 2 in all respects except for having the fins 35 angled to the side surfaces of the inertia member 36. As seen in FIGS. 3 and 3A, the angling of the fins enables air to be directed into the integral grooves 42 and thereby enhance the cooling effect of integral fins 44. Thus, the mechanism of cooling is by conduction to the coolings fins 35 and also by conduction through inertia member 36 to integral cooling fin 44. The cooling effect of cooling fins 44 is additionally augmented by the air directed thereby by fins 35. Thus, a compound cooling system is provided.

Turning now to FIGS. 4 and 5, there is shown an alternate embodiment of the invention wherein the hub, rather than being cast of metal as in the primary embodiment, is formed from a pair of plates. In FIG. 4, hub 116 is formed from plates so as to create bifurcated arms 146, 148. With this embodiment, the elastic element mounting surfaces 122 are angled to the axis of rotation of the rotary member (not shown). The plates may be retained by convenient means such as rivets, one of which is shown at 150.

Turning to FIG. 5, the angle of hub surfaces 222 is at right angles to the axis of rotation of the rotary member (not shown).

It is to be understood that the foregoing description is merely illustrative of the preferred embodiment of the invention and that the scope of the invention is not to be limited thereto, but is to be determined by the scope of the appended claims.

What is claimed is:

1. A torsional vibration damper for a rotary member comprising a hub member adapted to be mounted upon the rotary member for rotation therewith, a first vibratory movement energy absorbing and dissipating element means mounted upon said hub member, a cooling fin means mounted upon said first energy absorbing and dissipating element, a second vibratory movement energy absorbing and dissipating element means mounted upon said cooling fin means, a generally ring-shaped inertia member defining a pair of radially directed side surfaces mounted upon said second vibratory movement energy absorbing and dissipating element means, a plurality of radially directed, integral cooling fins on said side surfaces, and wherein said cooling fin means comprise a first and a second plurality of cooling fins positioned adjacent to said side surfaces and thereby said integral fins, whereby air flow past said first and second plurality and said integral fins provides for heat flow away from said first and second vibratory movement energy absorbing and dissipating element means.

2. The invention of claim 1 wherein said hub member includes an axially extending outer circumferential cylindrical surface concentric to the axis of rotation of the rotary member.

3. The invention of claim 2 wherein said first vibratory movement energy absorbing and dissipating element means is an element of elastic material.

4. The invention of claim 3 wherein said second vibratory movement energy absorbing and dissipating element means is an element of elastic material.

5. The invention of claim 4 wherein the elastic material of said first and second energy absorbing and dissipating elements is rubber.

6. The invention of claim 1 wherein said side surfaces define a plane and wherein said first and second plurality of cooling fins are oriented at an angle to said plane.

7. A torsional vibration damper for a rotary member rotatable about an axis of rotation comprising a bifurcated hub member adapted to be mounted upon the rotary member for rotation therewith, said hub member defining a pair of hub surfaces at an angle to the axis of rotation of the rotary member, a first vibratory movement energy absorbing and dissipating element means mounted upon said hub member, a cooling fin means mounted upon said first energy absorbing and dissipating element means, a second vibratory movement energy absorbing and dissipating element means mounted upon said cooling fin means, said cooling fin means serving to conduct heat away from said first and second vibratory movement energy absorbing and dissipating element means, and an inertia member mounted upon said second vibratory movement energy absorbing and dissipating element means.

8. The invention of claim 7 wherein said first vibratory energy absorbing and dissipating element means comprises an element on each of said hub surfaces, and wherein said second vibratory energy absorbing and dissipating element means comprises an element corresponding with each of said hub elements.

9. The invention of claim 8 wherein said cooling fin means comprise a plurality of cooling fins.

10. The invention of claim 7 wherein said angle is a right angle to said axis.

* * * * *

UNITED STATES PATENT OFFICE
CERTIFICATE OF CORRECTION

Patent No. 4,041,803            Dated August 16, 1977

Inventor(s) Alexander Goloff, et al

It is certified that error appears in the above-identified patent and that said Letters Patent are hereby corrected as shown below:

In the Abstract, line 7, "insertia" should read --inertia--.

Signed and Sealed this

Second Day of May 1978

[SEAL]

Attest:

RUTH C. MASON
Attesting Officer

LUTRELLE F. PARKER
Acting Commissioner of Patents and Trademarks